United States Patent

Burch et al.

[15] 3,638,676
[45] Feb. 1, 1972

[54] INLET DISTRIBUTOR FOR STORAGE TANKS

[72] Inventors: Charles O. Burch, 645 S. Walnut Ave., Arlington Heights, Ill. 60005; David H. May, 1336 Central Ave., Wilmette, Ill. 60091

[22] Filed: Nov. 3, 1969

[21] Appl. No.: 873,551

[52] U.S. Cl. .................................................. 137/576, 137/592
[51] Int. Cl. ................................... B65d 25/04, B67d 5/04
[58] Field of Search ........................... 137/592, 264, 590, 576

[56] References Cited

UNITED STATES PATENTS

| 675,677 | 6/1901 | Sanford | 137/592 X |
|---|---|---|---|
| 2,689,905 | 9/1954 | Harris | 137/576 X |
| 2,719,583 | 10/1955 | Malick | 137/576 X |
| 2,749,939 | 6/1956 | Bray | 137/592 |
| 2,767,736 | 10/1956 | Lackinger | 137/590 X |

FOREIGN PATENTS OR APPLICATIONS 1,205,295 4/1959 France .................................. 137/592

Primary Examiner—William R. Cline
Attorney—Milton W. Lee, Richard C. Hartman, Lannas S. Henderson, Dean Sandford and Robert E. Strauss

[57] ABSTRACT

A small distributor tank with perforated top is provided for installation on the floor of a larger storage tank, whereby petroleum products to be stored can be introduced through an inlet line to the distributor tank without agitating sediment on the bottom of the storage tank, and with a minimum of splashing friction which in conventional tank-filling devices tends to generate static electricity. Optional flow-directing baffles may also be included within the distributor tank.

8 Claims, 4 Drawing Figures

PATENTED FEB 1 1972　　3,638,676

INVENTORS
CHARLES O. BURCH
DAVID H. MAY
BY
*Lannas S. Henderson*
ATTORNEY 3,638,676

INLET DISTRIBUTOR FOR STORAGE TANKS

BACKGROUND AND SUMMARY OF INVENTION

In conventional storage tanks for petroleum products the inlet line generally terminates near the bottom of the tank. Oil flowing into the tank causes eddies and currents which tend to agitate foreign materials settled on the bottom of the tank such as dirt, water, iron oxide, silica, insoluble hydrocarbon products, etc., which are usually present in small quantities in petroleum distillates. Conventional outlet lines from such storage tanks are normally arranged so that little or no sediment on the bottom of the tank is picked up in the outgoing oil stream. Sometimes, the mouth of the outlet line is located a substantial distance above the floor of the tank to minimize sediment pickup.

However this is not completely effective where sediment is agitated and mixed with the oil in storage by the conventional flow of incoming oil as described. As a result it has been necessary in the past to resort to periodic tank cleaning, resulting in decreased total tank utilization and supply problems resulting from tankage being out of service. Also, in some tank outlet systems filters are utilized, and the presence of substantial foreign material in the withdrawn oil necessitates frequent changing of filter cartridges. A principal objective of the present invention is to provide an inlet distributor which will avoid any substantial agitation of sediment on the bottom of the tank, thereby permitting withdrawal of a cleaner product stream with less frequent tank cleaning and increased total tank utilization. Also, the life of filter cartridges in the outlet system is greatly increased, and in some cases it may be feasible to discontinue the use of filter units.

The conventional tank-filling systems described above are also prone to create a fire hazard during the initial fill cycle of an empty tank. Even though the inlet line to the tank discharges incoming fluid only a few inches above the floor of the tank, there is a considerable period of sloshing and splashing before the liquid level in the tank is high enough to submerge the mouth of the inlet line. During this period, the friction of the splashing liquid may generate sufficient static electricity to bring about a static discharge which, if the air/fuel ratio in the tank vapor space permits, may cause an explosion. This particular hazard is most often encountered in the storage of light petroleum distillates such as kerosene or jet fuel. It is another principal object of the invention to reduce to a minimum the splashing of liquid during the filling of storage tanks, thereby substantially eliminating the explosion hazard normally associated with conventional filling systems.

The foregoing and other objects are achieved herein by the use of a relatively small inlet distributor tank which is positioned on the floor of a conventional storage tank, preferably near an outer wall thereof, and into which the liquid inlet line discharges downwardly and laterally onto the floor thereof. The distributor tank is preferably cylindrical in shape, comprising substantially continuous enclosing sidewalls, and having a multiperforate, disc-shaped cover plate. The size of the distributor tank is such that the discharge end of the liquid inlet line becomes almost immediately submerged in oil, thus eliminating any splashing of liquid and resultant static electricity hazard. The liquid inlet line is positioned so as to impinge incoming liquid on the floor and/or sidewalls of the distributor tank, whence the flow is broken up and redistributed in such fashion that there is a continuous, gentle upward flow of incoming liquid through the multiperforate cover plate of the distributor tank. In order to assist in breaking up the force of the liquid flow discharging from the inlet line, one or more flow-directing baffles may be provided in the distributor tank, positioned so as to redirect portions of the incoming fluid against a wider area of the sidewalls of the distributor tank, thereby further minimizing any danger of strong liquid currents overflowing the distributor tank and disturbing sediment on the bottom of the storage tank. Details of the apparatus and its operations will be more apparent from the description which follows.

DETAILED DESCRIPTION

Figure 1:
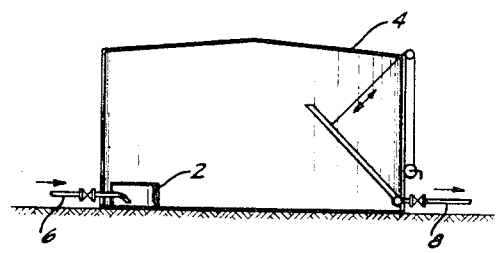
FIG. 1 is a vertical sectional view of a conventional storage tank, illustrating a preferred position therein of the distributor tank.
Figure 2:
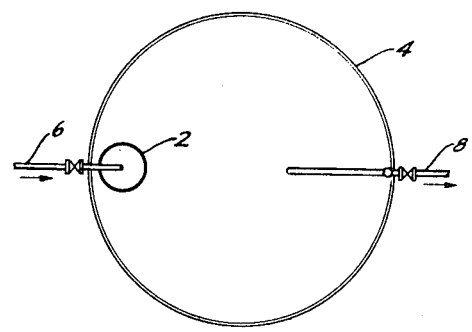
FIG. 2 is a plan view of the storage tank and distributor tank of FIG. 1, further illustrating the relative positions of the two.

Referring now to the drawings, FIGS. 1 and 2 illustrate a desirable relative positioning of the distributor tank 2 on the floor of conventional storage tank 4. Storage tank 4 may be of any desired size, and the size of the distributor tank is adjusted in relation to the size of the inlet line and the expected velocity of product in this line. Normally the diameter of the distributor tank is about one-tenth to one-twentieth that of the storage tank, preferably about one-fifteenth. The height of the distributor tank will depend to some extend upon its diameter, but mainly upon the volume rate at which fluid is to be delivered via inlet line 6. Large flow rates will normally require a somewhat greater tank height in order to obtain an even upward flow of liquid through the top thereof. In general, it may be said that the distributor tank height should be about two to six times the diameter of inlet line 6. FIGS. 1 and 2 also illustrate a typical positioning of conventional fluid outlet line 8, which forms no part of the present invention.

Figure 3:
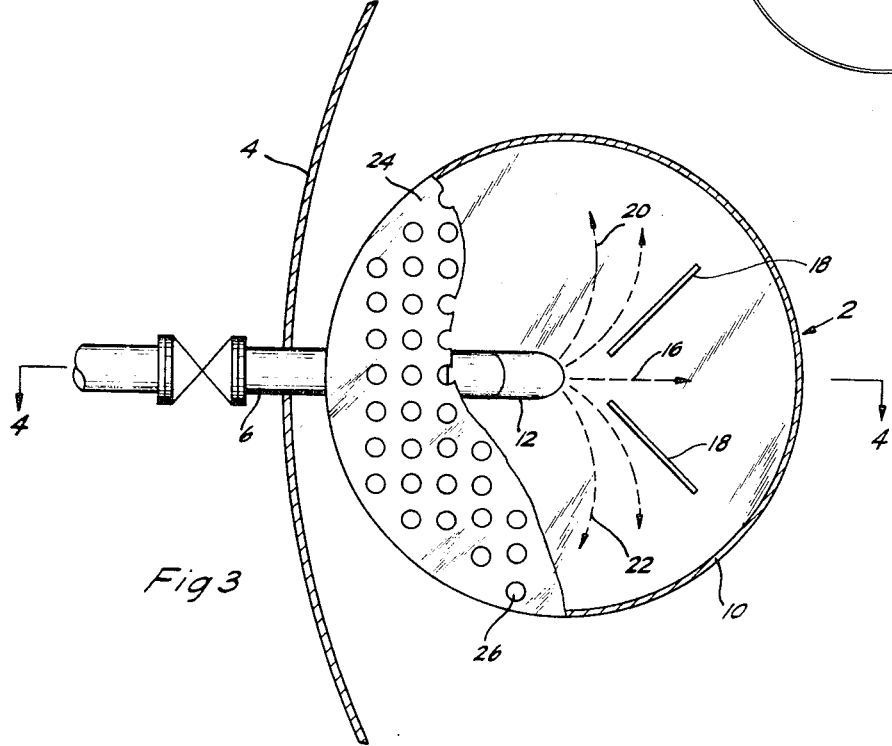
FIG. 3 is a detailed plan view, partly in section, of the distributor tank and inlet line shown in FIG. 1.
Figure 4:
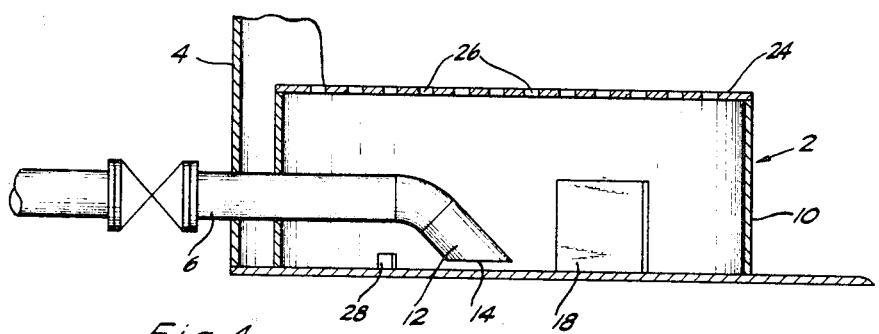
FIG. 4 is a vertical cross-sectional view of the distributor tank and inlet line taken along line 4—4 of FIG. 3.

FIGS. 3 and 4 illustrate more specifically the details of inlet line 6 and distributor tank 2. Inlet line 6 horizontally traverses the lower wall of storage tank 4 and upright wall 10 of distributor tank 2, terminating within the distributor tank in a downwardly and laterally directed delivery leg 12, preferably disposed at an angle of about 45° with respect to the bottom of the tank. The mouth 14 of delivery leg 12 is preferably cut diagonally, substantially parallel to the bottom of the distributor tank, thereby providing a more planar, multidirectional flow of entering liquid over the bottom of the distributor tank. The mouth of delivery leg 12 is preferably positioned about 2–6 inches above the floor of the distributor tank.

Liquid emerging from the mouth of delivery leg 12, though somewhat flattened and redirected by impingement on the bottom of the tank, tends to continue most strongly inwardly, in the direction indicated by arrow 16 of FIG. 3, until it ultimately impinges against the distributor tank wall 10. At high flow rates, mere impingement of the liquid against sidewall 10 may be insufficient to completely overcome the horizontal velocity of the fluid and prevent a localized overflow having sufficient residual horizontal velocity to disturb sediment in the storage tank. To overcome this problem one or more baffles 18 may be positioned in the distributor tank to divert all or a portion of the incoming liquid away from its normal area of impingement against the wall of distributor tank 2, thereby causing such liquid to be directed against a wider peripheral section of the wall, and more completely damping out horizontal liquid flow by translation to a gentle, nonturbulent upward flow. In the modification illustrated, two baffles 18 are shown positioned at an angle of about 45° with respect to the main flow direction of entering fluid, and spaced apart from each other sufficiently to provide an apical aperture through which about one-third of the entering liquid will flow in the direction indicated by arrow 16, the other approximately two-thirds being diverted outwardly as indicated by arrows 20 and 22. Obviously, many different baffle arrangements could be used to accomplish the same essential purpose. In some cases, as where fluid is delivered to the distributor tank at a relatively low volume rate, no baffles at all will be required.

After being laterally redirected toward the sidewalls of distributor tank 2 as described, incoming liquid then flows gently and more or less evenly upwardly through perforated cover plate 24, consisting of a circular metal plate containing perforations 26 distributed in any desired pattern over at least a substantial portion of its area so as to provide a gentle, even, upward flow of fluid from the distributor tank. As a general rule the diameter of the individual perforations 26 should not exceed the radius of inlet line 6, and the total area of perforations 26 should not be greater than about 40 percent, and preferably should be about 25 percent, of the total area of cover plate 24. If the individual perforations are too large in relation to the volume rate of entering fluid, or if their total area is excessive in relation to the area of the top 24, some liquid may emerge from the distributor tank with sufficient remaining horizontal velocity to agitate tank sediment. On the other hand, the total area of perforations 26 should be at least about twice, and preferably about five to 10 times, the cross-sectional area of inlet line 6 in order to avoid turbulent flow of liquid through the perforations such as might set up sediment-disturbing eddies and currents.

To illustrate the invention more specifically, the following preferred dimensions are cited for a distributor tank assembly for use in a storage tank having a diameter 10 times the diameter of the distributor tank:

ILLUSTRATIVE DIMENSIONS, INCHES

| | |
|---|---|
| Diameter of Inlet Line | 12 |
| Diameter of Distributor Tank | 108 |
| Height of Distributor Tank | 36 |
| Diameter of Top Perforations | 2 |
| Spacing of Top Perforations (Center-to-Center) | 3.5 |

Cover plate 24 is preferably removably affixed to distributor tank sidewalls 10, as by means of bolts, clamps or the like in order to facilitate inspection or cleaning of the interior. Baffles 18 and sidewalls 10 are preferably affixed to the bottom of tank 4 by weldments, although removable attachments such as flanges and bolts are also contemplated.

Although for purposes of this invention, the distributor tank sidewalls 10 must be substantially imperforate, it is desirable to provide means for draining the distributor tank when storage tank 4 is to be drained, as for cleaning or other purposes. Such a drain means is illustrated in FIG. 4 in the form of one or more small drain ports 28 located at the bottom of the sidewall, preferably in a section thereof remote from the major areas of impingement of incoming liquid against sidewalls 10. In the modification illustrated, two such drain ports are contemplated, each about 1 inch by 2 inches in size.

The foregoing description of a specific distributor tank arrangement is not intended to be limiting in scope; obviously many modified versions could achieve the same essential results. Instead of a cylindrical distributor tank, many other shapes may be utilized such as octagonal or even rectangular shapes, preferably with modified baffling arrangements tailored to the shape of the tank. In one modification a section of the storage tank wall may also form part of the wall of the distributor tank. In another modification, the floor of the distributor tank may be sunk a few inches below the floor of the storage tank, with the mouth 14 of delivery leg 12 being positioned below the floor of the storage tank, whereby inlet line 6 can also serve as a suction line terminating in a sump for draining the entire storage tank and distributor tank. Those skilled in the art will readily understand that many such modifications may be made without departing from the true scope of the invention, which is intended to be defined by the following claims:

We claim:
1. A storage tank construction for liquids comprising in combination:
   1. a relatively large outer storage tank;
   2. a relatively small inlet distributor tank positioned on the floor of said storage tank, and having a cover plate supported on substantially continuous enclosing sidewalls, said cover plate having multiple, unobstructed perforations distributed over at least a substantial portion of its area providing unobstructed passageways from the interior of said distributor tank to the interior of said outer storage tank;
   3. a liquid inlet line communicating from the exterior of said outer storage tank to the interior of said distributor tank and terminating therein in liquid delivery relationship against and a short distance above the bottom of said distributor tank; said distributor tank and inlet line being cooperatively adapted to provide a gentle, continuous upward flow liquid into said outer storage tank through the perforations in said cover plate.

2. A tank construction as defined in claim 1 wherein the sidewalls of said distributor tank are imperforate save for one or more small drain ports located adjacent the floor thereof and a port for said liquid inlet line.

3. A tank construction as defined in claim 1 including in combination therewith one or more baffles positioned within said distributor tank and adapted to redirect at least some of the liquid flow from said inlet line away from its normal area of impingement against the walls of said distributor tank, thereby providing a more even areal upward flow through said multiperforate cover plate.

4. A tank construction as defined in claim 1 wherein said inlet line terminates within said distributor tank in a downwardly and laterally directed delivery leg, the mouth of which is cut diagonally substantially parallel to and a short distance above the bottom of said distributor tank to thereby provide a more planar, multidirectional flow of entering liquid over the bottom of said distributor tank.

5. A tank construction as defined in claim 1 wherein the total area of perforations in said multiperforate cover plate is less than about 40 percent of the area of said cover plate, but at least equal to an area twice the cross-sectional area of said inlet line.

6. A storage tank construction for liquids comprising in combination:
   1. a relatively large cylindrical storage tank;
   2. a relatively small, cylindrical inlet distributor tank positioned on the floor and near a sidewall of said storage tank, said distributor tank having a substantially uniformly perforated cover plate and a diameter less than about one-tenth of the diameter of said storage tank, the total area of perforations in said cover plate being less than about 40 percent of the cover plate area;
   3. a liquid inlet line horizontally traversing a sidewall of said distributor tank and terminating therein in a downwardly and laterally directed delivery leg, the mouth of which is cut diagonally substantially parallel to and a short distance above the bottom of said distributor tank, to thereby provide a more planar, multidirectional flow of entering liquid over the bottom of said distributor tank; and
   4. one or more baffles positioned on the floor of said distributor tank diagonally to the principal direction of liquid flow from said delivery leg to thereby redirect at least some of said liquid flow away from its normal area of impingement against the walls of said distributor tank, thereby providing a more even, areal upward flow of liquid through said perforated cover plate.

7. A tank construction as defined in claim 6 wherein the total area of perforations in said cover plate is at least about two times the cross-sectional area of said inlet line.

8. A tank construction as defined in claim 6 wherein the sidewalls of said distributor tank are imperforate save for one or more small drain ports located adjacent the floor thereof and a port for said liquid inlet line.

* * * * *